United States Patent [19]

Korin

[11] Patent Number: 5,137,637
[45] Date of Patent: Aug. 11, 1992

[54] ROTATIONAL HIGH FLUX MEMBRANE DEVICE

[75] Inventor: Amos Korin, Weston, Conn.

[73] Assignee: Exxon Chemical Patents Inc., Linden, N.J.

[21] Appl. No.: 717,160

[22] Filed: Jun. 18, 1991

[51] Int. Cl.$^5$ .................. B01D 61/18; B01D 63/10; B01D 63/16
[52] U.S. Cl. .................. 210/634; 210/321.67; 210/321.74; 210/321.83
[58] Field of Search .................. 210/198.2, 634, 644, 210/649, 650, 321.67, 321.68, 321.74, 321.76, 321.83, 321.85

[56] References Cited

U.S. PATENT DOCUMENTS

| | | | |
|---|---|---|---|
| 3,567,030 | 3/1971 | Loeffler | 210/321 |
| 3,669,879 | 6/1972 | Berriman | 210/23 |
| 3,872,014 | 3/1975 | Schell | 210/232 |
| 4,025,425 | 5/1977 | Croopnick et al. | 210/23 |
| 4,083,780 | 4/1978 | Call | 210/23 H |
| 4,132,649 | 1/1979 | Croopnick et al. | 210/347 |
| 4,576,715 | 3/1986 | Michaels et al. | 210/347 |
| 4,838,970 | 6/1989 | Thibos | 156/169 |
| 4,861,487 | 8/1989 | Fulk, Jr. | 210/644 |
| 4,902,417 | 2/1990 | Lien | 210/321.74 |
| 4,925,557 | 5/1990 | Ahlberg, Jr. et al. | 210/321.68 |

*Primary Examiner*—Frank Sever

[57] ABSTRACT

A spiral wound membrane module for use in separating at least part of one component from a feedstream, the module comprising: a generally-hollow rotatable shaft having a means for supplying a feedstream; a means capable of rotating the shaft about its axis of rotation; two permselective membranes affixed to the shaft and spaced from each other by a permeate spacer to provide a first membrane channel therebetween; a feed spacer disposed about the exterior surfaces of the permselective membranes such that a second membrane channel is formed when the permselective membranes are spirally wrapped around the shaft in overlapping relationship one upon the other to form a compact membrane roll; a means for removal of a permeate stream from the first membrane channel to the exterior of the membrane module; and a means for removal of a retentate stream from the second membrane channel to the exterior of the membrane module.

46 Claims, 7 Drawing Sheets

ROTATIONAL HIGH FLUX MEMBRANE DEVICE

The present invention relates primarily to a novel membrane module capable of producing high flux rates and low fouling. In particular, the membrane module is a spiral wound membrane disposed about a center feed shaft which causes feed to flow in a spiral direction to create Taylor vortices, shear forces and centrifugal forces by rotating the membrane around its axis.

BACKGROUND OF THE INVENTION

Taylor vortices formed in a thin membrane channel are known to prevent membrane fouling and to increase flux by reducing the boundary layer near the membrane surface due to enhanced mass transfer of solute or suspended materials from the membrane surface to the bulk of the solution.

Conventional membrane devices known to increase flux are spinning discs, spinning annular cylinders, and vibrating discs.

Some examples of spinning disc membrane devices are set forth in U.S. Pat. No. 4,925,557 (Ahlberg, Jr. et al.), which issued May 15, 1990, U.S. Pat. No. 4,025,425 (Croopnick et al.), which issued May 24, 1977, U.S. Pat. No. 4,132,649 (Croopnick et al.), which issued Jan. 2, 1979, and U.S. Pat. No. 4,576,715 (Michaels et al.), which issued Mar. 18, 1986. The Ahlberg, Jr. et al. patent discloses a rotating membrane filter unit wherein the central portion of hollow filter discs covered with controlled pore size membranes communicate with the interior of the hollow rotating mounting shaft with the membrane surface of the rotating disc being kept clear by rotation and, in some cases intermittent back flushing, and with filtrate draw off thru the hollow rotating mounting shaft.

U.S. Pat. Nos. 4,025,425, 4,132,649 and 4,576,715 all relate to a purifying apparatus which includes a stack of filtration packs, each including a sheet-like carrier and a pair of membranes lying over opposite faces of the carrier. The packs are assembled along a predetermined axis into a stack, with radially inner and outer gaskets separating adjacent packs from one another. The inner gaskets are stacked to form the equivalent of a hollow shaft. The assembled stack of packs and gaskets forms a rotor which is rapidly rotated, while water or other feed fluid is fed along the shaft formed by the inner gaskets and flows through grooves in the gaskets into the space between adjacent membrane packs. As the rotor rotates, the feed fluid flows radially outwardly, so that pure water or other permeate contained in the feed fluid, permeate through the membranes and passes radially outwardly along the pack to the periphery, where the permeate then flies off into a collecting vessel.

Spinning annular cylinder membrane devices are set forth in U.S. Pat. No. 3,669,879 (Berriman), which issued on Jun. 13, 1972, and 3,567,030 (Loeffler), which issued on Mar. 2, 1971. The Berriman patent discloses a separation process of the reverse osmosis type useful for generating fresh water by forcing salt water against a semipermeable membrane that allows only pure water to pass, which uses centrifugal forces created by rotating a basket to build up a pressure head of water supplied to the basket to force water through the membrane disposed about the basket. Similarly, the Loeffler patent relates to a separation device for separating materials by the process of reverse osmosis wherein centrifugal force is used to carry out the reverse osmosis.

The present inventor has discovered that a enhanced membrane device can be created by combining the rotating features of the above-mentioned patents and a spiral wound membrane. The novel spiral wound rotating membrane device provides a design which increases flux and reduces fouling by a combination of shear forces, centrifugal forces and Taylor vortices.

Spiral wound membranes have been used in liquid/solid separation as evidenced by U.S. Pat. No. 3,872,014 (Schell), which issued on Mar. 18, 1975. However, these conventional spiral wound membrane devices are typically stationary in design.

Although U.S. Pat. No. 3,669,879 (Berriman) discloses a spiral wound membrane disposed about the outer basket of a rotating membrane device, it does not disclose the unique configuration of the rotating spiral wound membrane according to the present invention so as to produce a membrane device which provides increased flux by the combination of shear forces, centrifugal forces and Taylor vortices, i.e., a whirl or eddy. That is, the spiral wound membrane applied according to the Berriman patent about the outer basket only increases the flux rate by means of the centrifugal forces generated by the rotation of the basket, whereas the design of the present invention increases flux not only by centrifugal force, but also via the Taylor vortices and shear forces created by its unique placement about the center feed shaft. By rotating the novel spiral wound membrane around its axis at a speed from 10 rpm to 20,000 rpm the present inventor believes that the rotation will form the above-mentioned flow effect which will increase flux rates and reduce fouling.

The present invention also provides many additional advantages which shall become apparent as described below.

SUMMARY OF THE INVENTION

A spiral wound membrane module for use in separating at least part of one component from a feedstream. The module comprises: a generally-hollow rotatable shaft having a means for supplying a feedstream; a means capable of rotating the shaft about its axis of rotation; two permselective membranes affixed to the shaft and spaced from each other by a permeate spacer to provide a first membrane channel therebetween; a feed spacer disposed about the exterior surfaces of the permselective membranes such that a second membrane channel is formed when the permselective membranes are spirally wrapped around the shaft in overlapping relationship one upon the other to form a compact membrane roll; a means for removal of a permeate stream from the first membrane channel to the exterior of the membrane module; and a means for removal of a retentate stream from the second membrane channel to the exterior of the membrane module.

Preferably, the spiral wound membrane module comprises: a generally-hollow rotatable shaft having a wall intermediate its length dividing the shaft into a first compartment and a second compartment with means for introducing a feedstream to the first compartment of the shaft and means for removing a permeate stream from the second compartment of the shaft; a means capable of rotating the shaft about its axis of rotation; two permselective membranes affixed to the shaft and spaced from each other by a permeate spacer to provide a first membrane channel therebetween, the first membrane channel being in fluid communication with the second compartment of the shaft; a feed spacer disposed about the exterior surfaces of the permselective membranes such that a second membrane channel is formed when the permselective membranes are spirally wrapped around the shaft in overlapping relationship one upon the other to form a compact membrane roll; and a means for removal of a retentate stream from the second membrane channel to the exterior of the membrane module.

The center feed rotatable shaft may be modified to provide alternative means for introducing a feedstream to the rotating spiral wound membrane and also for withdrawing permeate therethrough. In particular, the rotatable shaft may include a sealing means and a concentric permeate tube disposed within the compartment of the shaft used primarily for introduction of the feedstream. The rotatable shaft may also be designed such that a partition wall is disposed vertically throughout the shaft wherein one compartment is used to supply the feedstream and the other compartment is used to withdraw the permeate.

A further object of the present invention is a method for separating at least part of one component from a multi-component feedstream which comprises: feeding the feedstream to a spiral wound membrane module; rotating the shaft and the affixed permselective membranes such that centrifugal forces, shear forces and Taylor vortices are applied to the feedstream; diffusing a permeate stream through the permselective membranes and into the first membrane channel; removing the permeate stream from the first membrane channel; and removing the retentate of the feedstream from the second membrane channel.

Other and further objects, advantages and features of the present invention will be understood by reference to the following specification in conjunction with the annexed drawings, wherein like parts have been given like numbers.

DESCRIPTION OF THE PREFERRED EMBODIMENTS

The novel separation device described herein is suitable for many liquid/solid separations, especially oil-in-water emulsions, clay slurries, fruit juices, and milk concentrations such as hey. High flux and low fouling is achieved in a spiral wound membrane module by allowing the feed to flow in the spiral direction through a membrane channel and creating Taylor vortices, shear forces and centrifugal forces by rotating the membrane module around its axis.

Use of this device to separate the various feedstreams will necessitate the adaptation of permselective membranes which are determined to be suitable for each application. The most commonly used membranes are those which separate the constituents of the feedstream via ultrafiltration, microfiltration or reverse osmosis processes. Ultrafiltration is filtration by suction or pressure through a semipermeable membrane having small pores. Microfiltration is a filtration process by which a component of a feedstream is forced through a semipermeable membrane having rather large pores by a pressure differential. Reverse osmosis is filtration by forcing a feedstream against a semipermeable membrane such that the pressure differential across the membrane causes permeate to flow from a stronger solution to a weaker solution.

The membrane configuration typically includes one or more spiral channels or membrane channels wound together into a cylindrical membrane module. The membrane channel is formed from two membrane layers having a flow spacing material therebetween such that a liquid permeate can diffuse through the permselective membrane layers into the channel. By feeding the feedstream from the center of the spiral wound membrane module to its periphery and simultaneously rotating the module around its axis at a speed from 10 rpm to about 20,000 rpm the present inventor has discovered that a separation device can be constructed having an increased flux rate and reduced fouling of the membrane.

Figure 1:
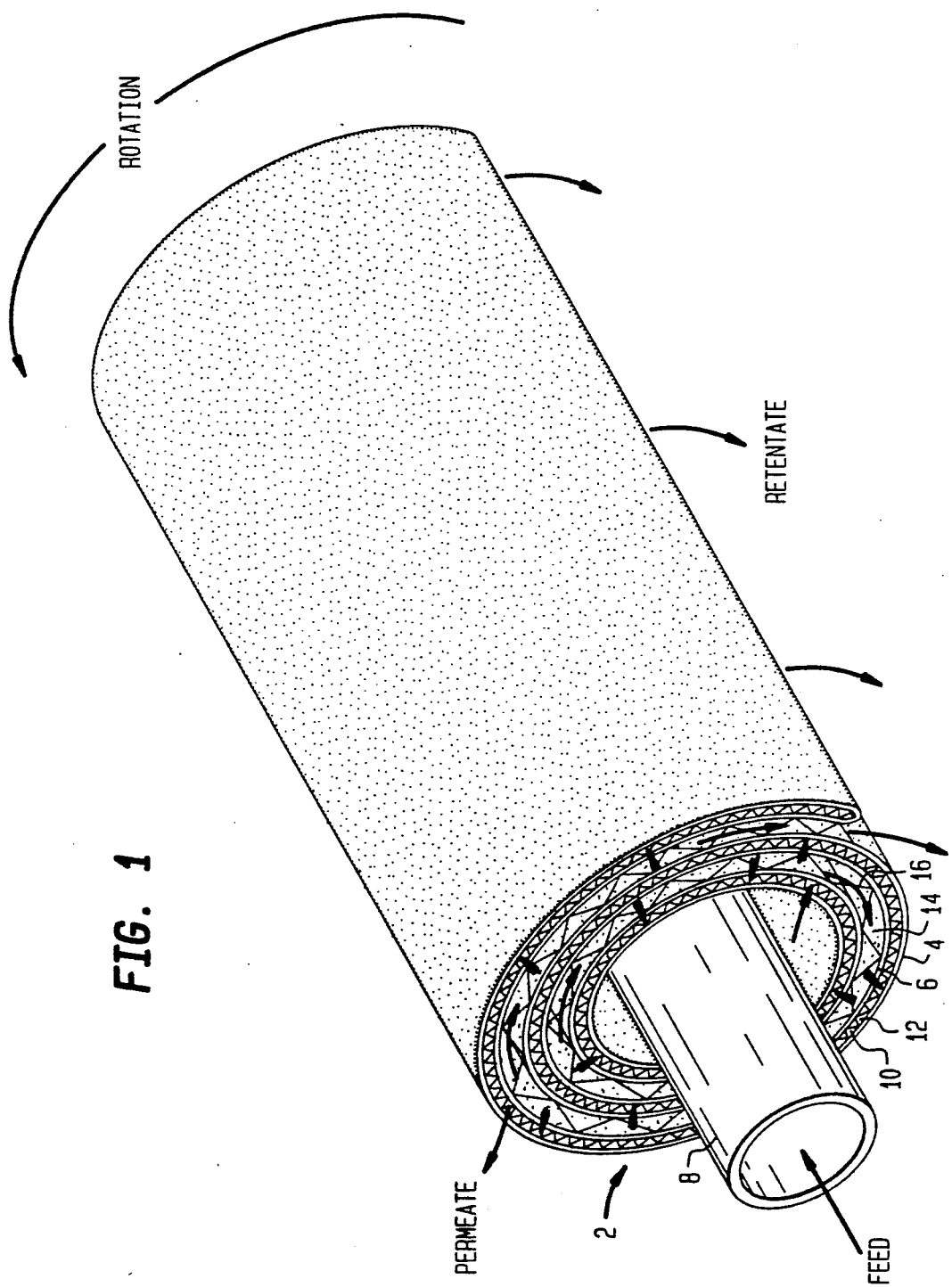
FIG. 1 is a front-top perspective view of a schematic representation of a spiral wound membrane device in accordance with the present invention.

The present invention can best be describe by referring to the attached drawings, wherein FIG. 1 depicts a spiral wound membrane module 2 comprising a first permselective membrane 4 and a second permselective membrane 6 which are wrapped around center feed shaft 8 to form a spiral roll. A first membrane channel 10 is formed between permselective membranes 4 and 6 by means of a permeate spacer 12. A second membrane channel 14 is formed by means of a feed spacer 16 being disposed about the exterior surface of the permselective membranes such that when the permselective membranes are wrapped around feed shaft 8 second membrane channel 14 is formed.

As membrane module 2 is rotated about its axis, a feedstream is introduced into second membrane channel 14 via center feed shaft 8. Due to Taylor vortices, centrifugal forces and shear forces at least part of one component (i.e., a permeate) of the feedstream diffuses through permselective membranes 4 and 6, and enters first membrane channel 10 for removal from the system. The retentate makes its way through second membrane channel 14 and is eventually either recycled back to the feedstream for reprocessing or removed from the system.

Figure 2:
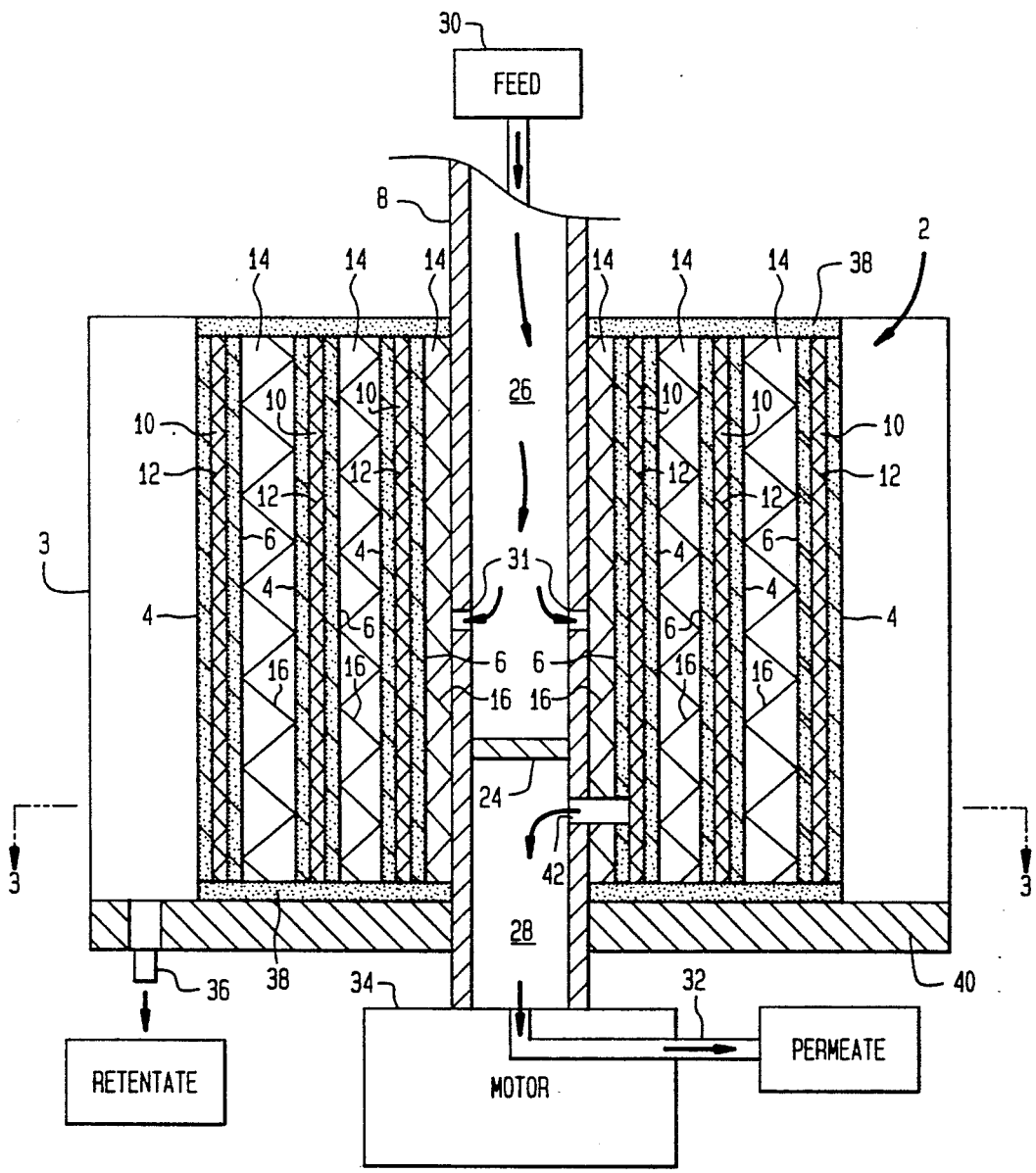
FIG. 2 is a cross-sectional view of a schematic representation of one embodiment of a spiral wound membrane device according to the present invention having a permeate port disposed in a lower compartment of the rotating center feed shaft.
Figure 3:
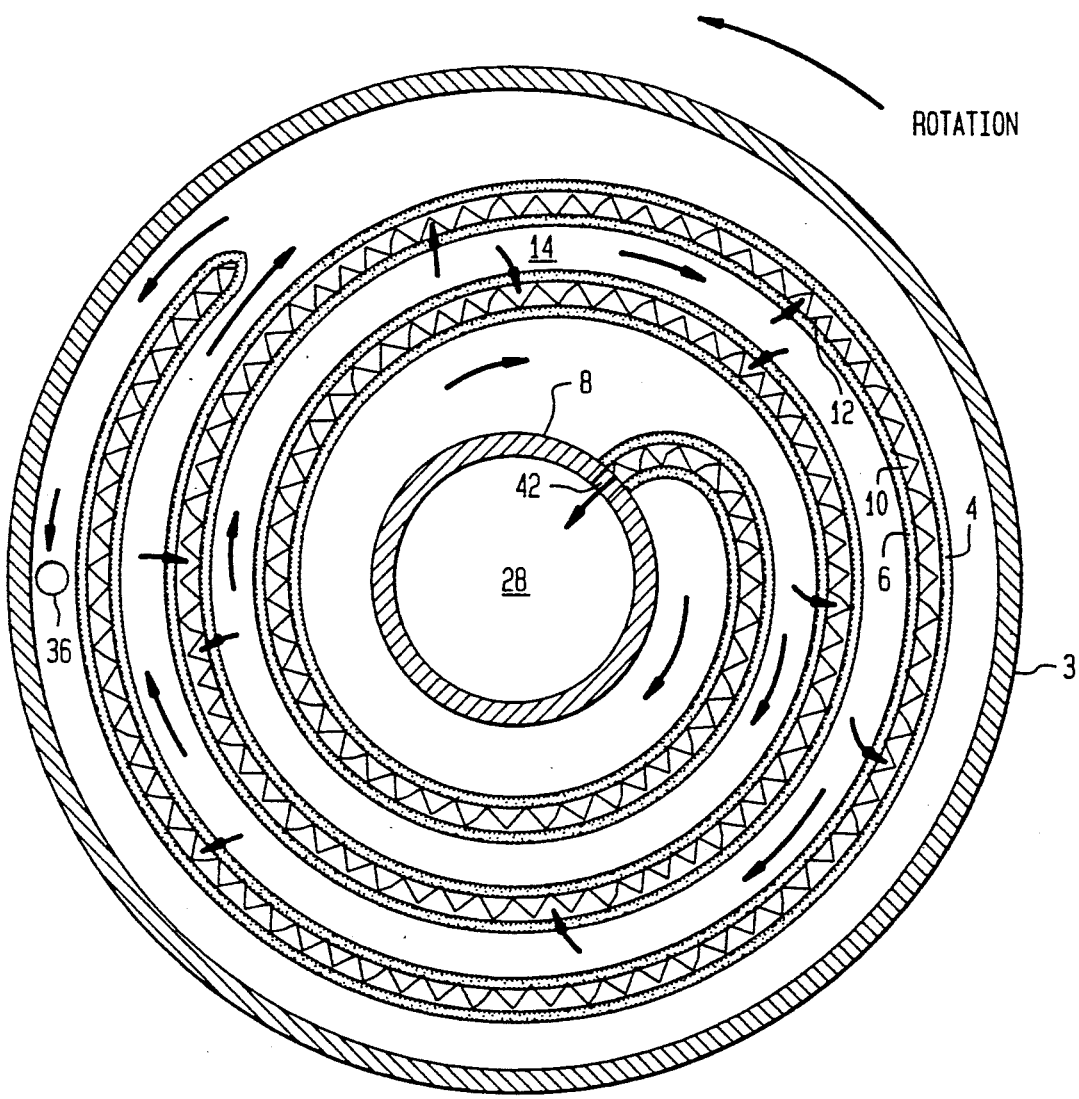
FIG. 3 is a cross-sectional view along line A—A of FIG. 2.

FIGS. 2 and 3 demonstrate one preferred embodiment according to the present invention wherein a spiral wound membrane module 2 comprises: a generally-hollow rotatable shaft 8 having a wall 24 intermediate its length dividing shaft 8 into a first compartment 26 and a second compartment 28 with means 30 for introducing a feedstream to first compartment 26 and means 32 for removing a permeate stream from second compartment 28; a means 34 capable of rotating shaft 8 and membrane module 2 about their axes of rotation; two permselective membranes 4 and 6 affixed to shaft 8 and spaced from each other by a permeate spacer 12 to provide a first membrane channel 10 therebetween, first membrane channel 10 being in fluid communication with second compartment 28; a feed spacer 16 disposed about the exterior surfaces of permselective membranes 4 and 6 such that a second membrane channel 14 is formed when permselective membranes 4 and 6 are spirally wrapped around shaft 8 in overlapping relationship one upon the other to form a compact membrane roll 2; and a means 36 for removal of a retentate stream from second membrane channel 14 to the exterior of membrane module 2. Membrane module 2 is enclosed within outer shell 3. The feedstream is fed into first compartment 26 of shaft 8 by feed pump means 30 and enters second membrane channel 14 via feed ports 31.

The membrane module or roll 2 is restrained from unspiralling by means of an adhesive seam 38 disposed along each edge of permselective membranes 4 and 6. Module 2 is mounted on rotating plate 40 which is affixed to shaft 8.

Permeate spacer 12 defining first membrane channel 10 is preferably an open grid sheet material through which the resultant permeate stream may flow. Permeate spacer 12 is typically formed from a plastic material selected from the group consisting of polyethylene, polypropylene and vinyl. Optionally, permeate spacer 12 can be a woven fabric. One example is a grid netting marketed under the trademark VEXAR ® by duPont. Feed spacer 16 which is used to define second membrane channel 14 is also an open grid sheet material through which the feedstream and retentate stream may flow.

Permselective membranes 4 and 6 are preferably selected from the group consisting of: polysulfone membranes, cellulose acetate membranes and any other semipermeable membrane capable of separating the desired permeate stream from the feedstream. Preferably, the membrane is capable of operating under ultrafiltration, microfiltration or reverse osmosis conditions. Permselective membranes 4 and 6 are affixed to shaft 8 by means of a clamp, adhesive or heat sealing. In this manner, permselective membrane 4 and 6 rotate together with shaft 8 during the separation process.

According to this embodiment permeate is removed from first membrane channel 10 via permeate port 42 and thereafter removed from second compartment 28 by conduit means 32.

Figure 4:
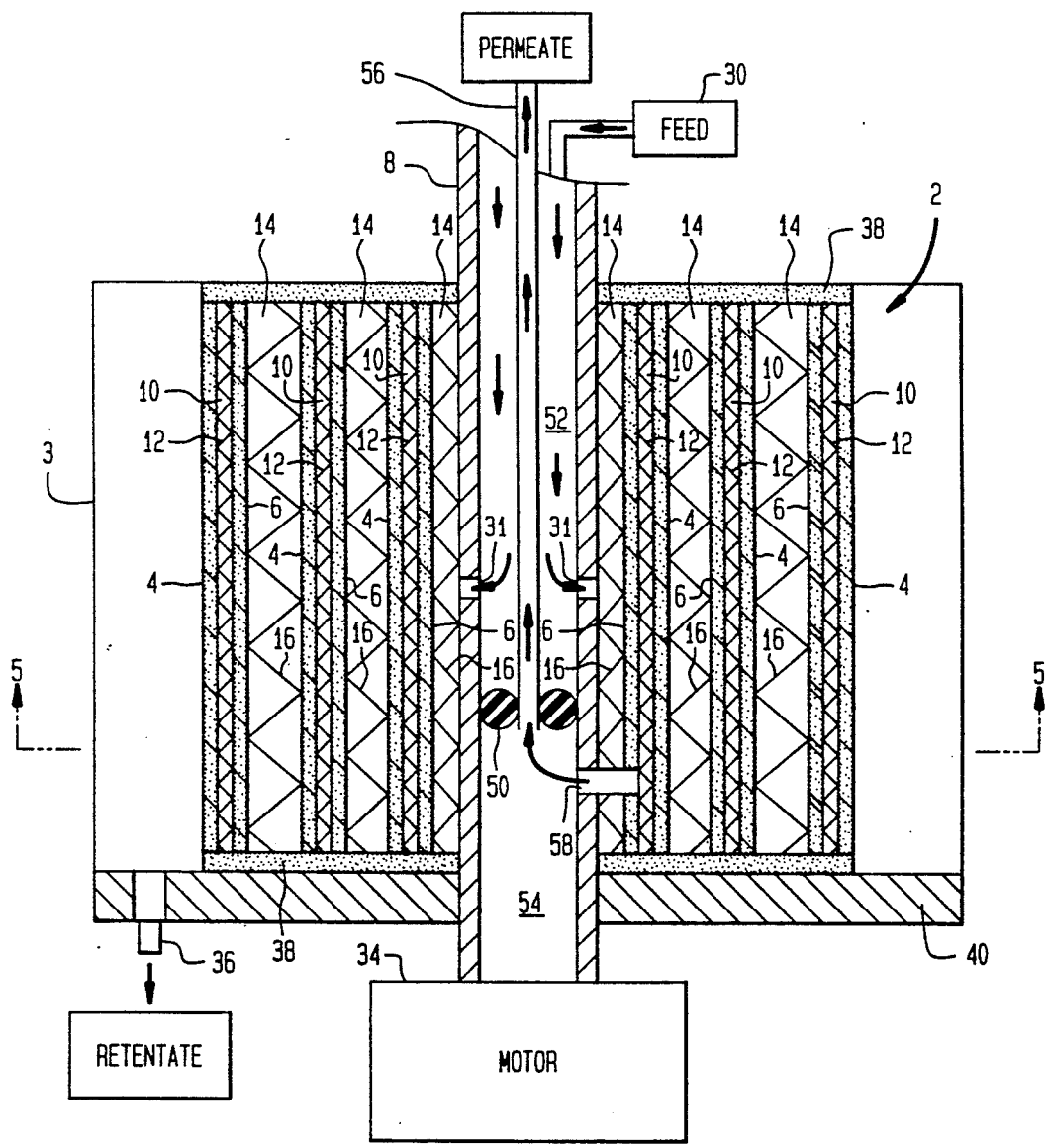
FIG. 4 is a cross-sectional view of a schematic representation of another embodiment of a spiral wound membrane device according to the present invention having a permeate port disposed in a lower compartment of the rotating center feed shaft and a concentric permeate tube disposed within the rotating center feed shaft.
Figure 5:
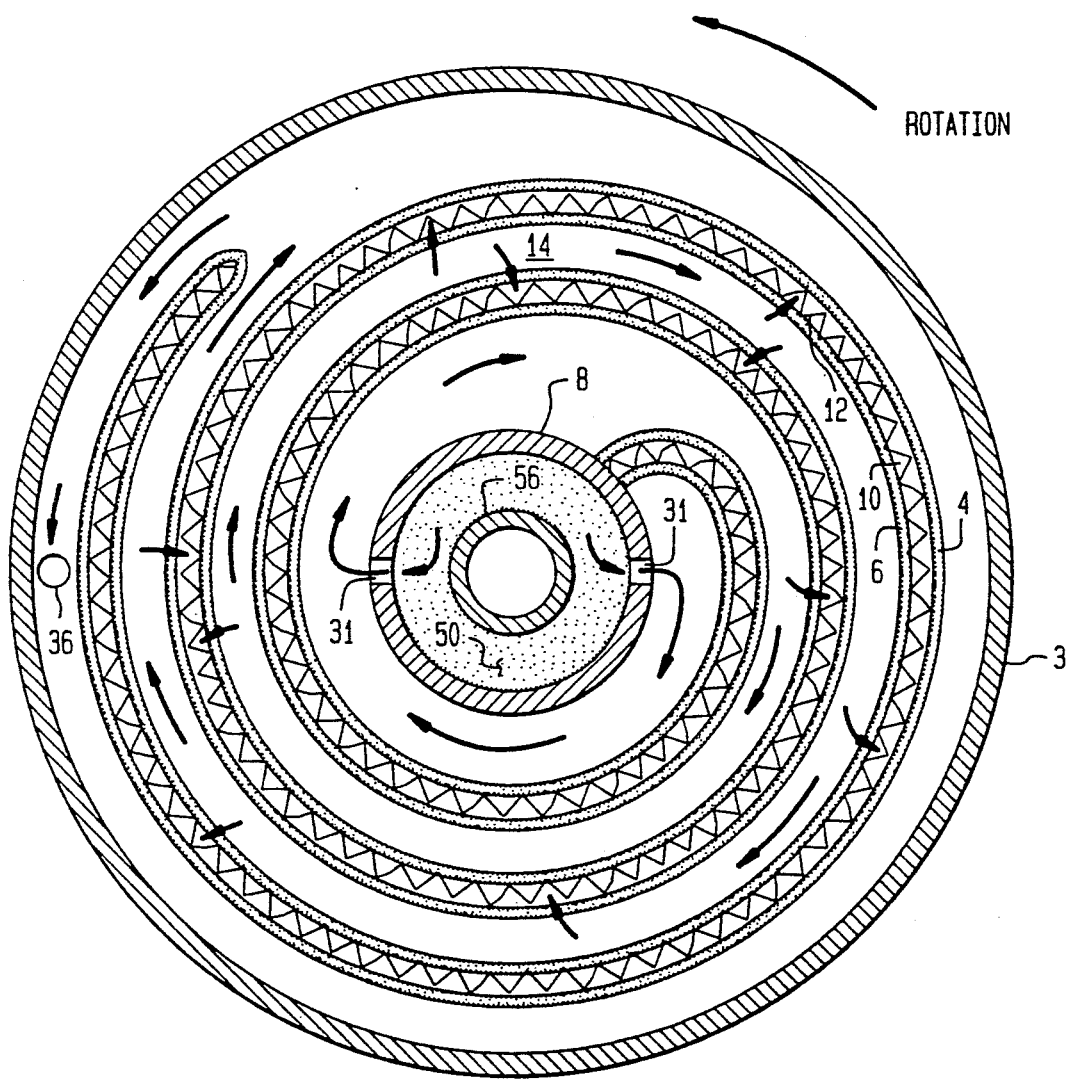
FIG. 5 is a cross-sectional view along line B—B of FIG. 4.

FIGS. 4 and 5 depict another embodiment according to the present invention wherein rotatable shaft 8 includes a sealing means 50 disposed intermediate its length dividing shaft 8 into a first compartment 52 and a second compartment 54 with means 30 for introducing a feedstream to first compartment 52 of shaft 8 and means 56 for removing a permeate stream from second compartment 54 of shaft 8 through first compartment 52.

The means 56 for removing the permeate stream from second compartment 54 through first compartment 52 is a concentric permeate tube disposed within first compartment 52. Permeate is removed from first membrane channel 10 via a port 58 disposed within shaft 8 which is in fluid communication with passageway 10. Sealing means 50 is a rubber o-ring disposed about concentric permeate tube 56.

Figure 6:
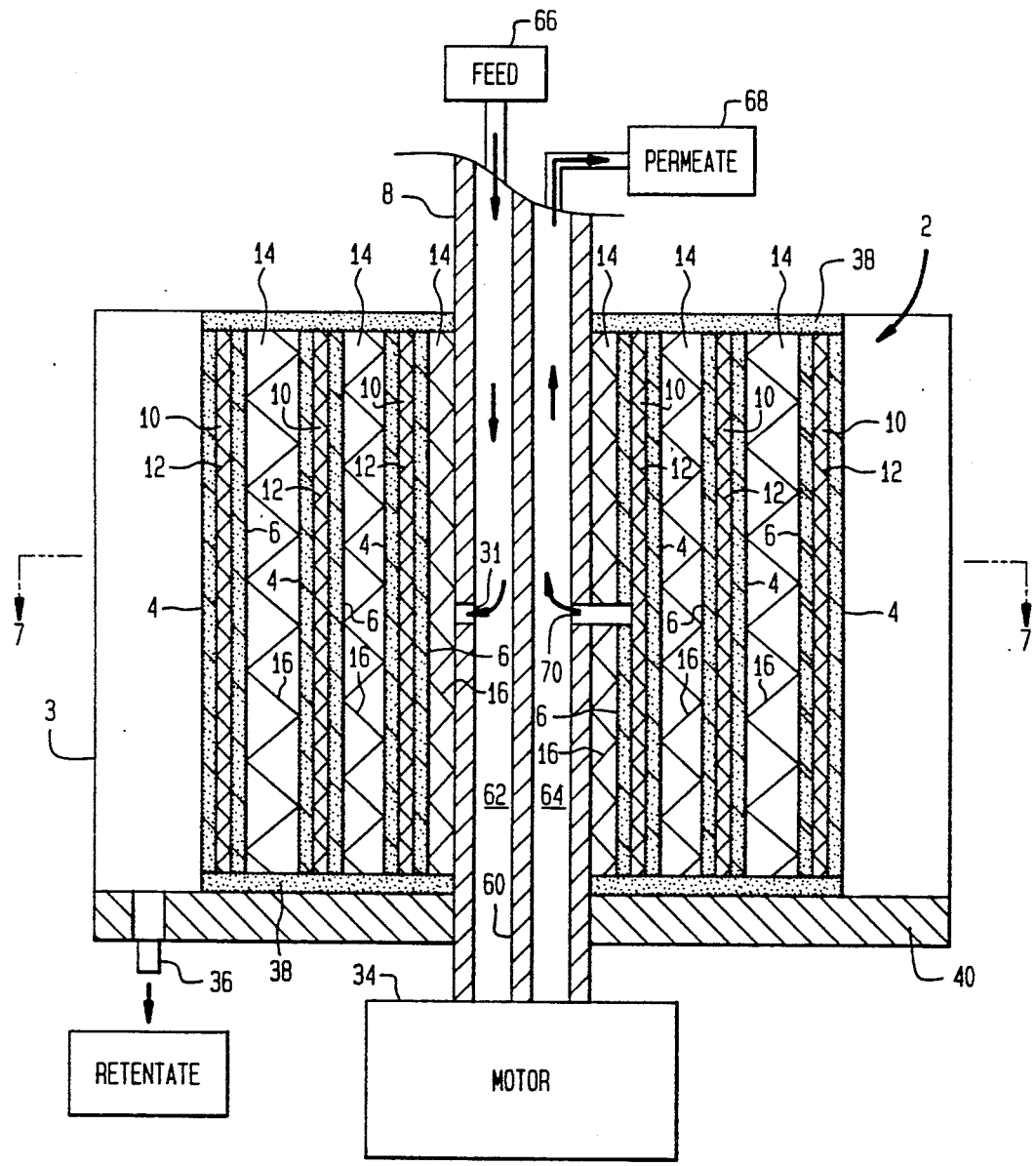
FIG. 6 is a cross-sectional view of a schematic representation of still another embodiment of a spiral wound membrane device according to the present invention wherein the rotating center shaft includes a feed compartment and a permeate compartment.
Figure 7:
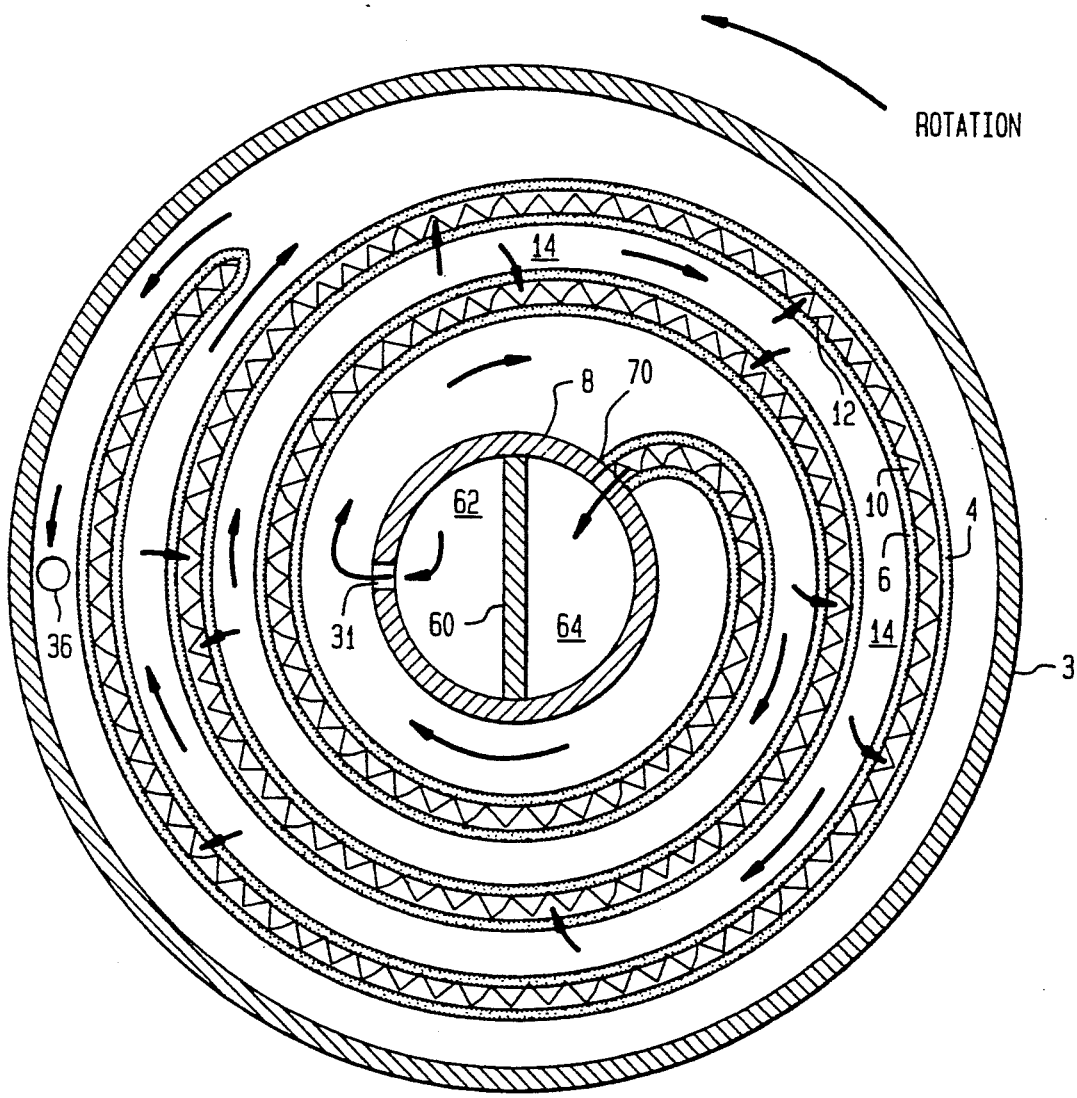
FIG. 7 is a cross-sectional view along line C—C of FIG. 6.

FIGS. 6 and 7 depict shaft 8 having a partition 60 vertically disposed along its entire length dividing shaft 8 into a first compartment 62 and a second compartment 64 with means 30 for introducing a feedstream to first compartment 62 and means 68 for removing a permeate stream from the second compartment 64. Permeate is removed from first membrane channel 10 via a permeate port 70 disposed within shaft 8 and in fluid communication with first membrane channel 10. The feedstream is fed to first compartment 62 via feed means 66 and enters second membrane channel 14 via feed port 31 disposed within the wall of shaft 8.

At least part of one component from a multi-component feedstream can be separated using this spiral wound membrane module by delivering the feedstream to the center of a spiral wound membrane module, rotating the shaft and the affixed permselective membranes such that centrifugal forces, shear forces and Taylor vortices are applied to the feedstream, diffusing a permeate stream through the permselective membranes and into the first membrane channel, removing the permeate stream from the first membrane channel and into the second compartment within the shaft, and removing the retentate of the feedstream from the second membrane channel.

While I have shown and described several embodiments in accordance with my invention, it is to be clearly understood that the same are susceptible to numerous changes apparent to one skilled in the art. Therefore, I do not wish to be limited to the details shown and described but intend to show all changes and modifications which come within the scope of the appended claims.

What is claimed is:

1. A spiral wound membrane module for use in separating at least part of one component from a feedstream, said module comprising:

a generally-hollow rotatable shaft having a means for supplying a feedstream;

a means capable of rotating said rotatably shaft about its axis of rotation;

two permselective membranes affixed directly to said rotatably shaft and spaced from each other by a permeate spacer to provide a first membrane channel therebetween, said permselective membranes are spirally wrapped around said rotatably shaft;

a feed spacer disposed about the exterior surfaces of said permselective membranes such that a second membrane channel is formed when said permselective membranes are spirally wrapped around said rotatable shaft in overlapping relationship one upon the other to form a compact membrane roll;

a means for removal of a permeate stream from said first membrane channel to the exterior of said membrane module; and a means for removal of a retentate stream from said second membrane channel to the exterior of said membrane module; said permselective membranes having properties sufficient to enable its flux to be increased by the combination of shear forces, centrifugal forces and Taylor vortices.

2. The spiral wound membrane module according to claim 1 further comprising a means for restraining the unspiralling of the membrane roll.

3. The spiral wound membrane module according to claim 2 wherein said means for restraining the unspiralling of the membrane roll is an adhesive seam disposed along each edge of the permselective membranes.

4. The spiral wound membrane module according to claim 1 wherein said permeate spacer defining the first membrane channel is an open grid sheet material through which the resultant permeate stream may flow.

5. The spiral wound membrane module according to claim 4 wherein said permeate spacer is formed from a plastic material selected from the group consisting of polyethylene, polypropylene and vinyl.

6. The spiral wound membrane module according to claim 1 wherein said permeate spacer is a woven fabric.

7. The spiral wound membrane module according to claim 1 wherein said feed spacer defining the second membrane channel is an open grid sheet material through which the feedstream and retentate stream may flow.

8. The spiral wound membrane module according to claim 7 wherein said feed spacer is formed from a plastic material selected from the group consisting of polyethylene, polypropylene and vinyl.

9. The spiral wound membrane module according to claim 1 wherein said permselective membranes are selected from the group consisting of: polysulfone membranes, cellulose acetate membranes and any other semipermeable membrane capable of separating the desired permeate stream from the feedstream.

10. The spiral wound membrane module according to claim 1 wherein the permselective membranes ar affixed to said shaft by means of a clamp, adhesive or heat sealing.

11. A spiral wound membrane module for use in separating at least part of one component from a feedstream, said module comprising:
    a generally-hollow rotatable shaft having a wall intermediate its length dividing said shaft into a first compartment and a second compartment with means for introducing a feedstream to the first compartment of said rotatable shaft and means for removing a permeate stream from the second compartment of said rotatable shaft;
    a means capable of rotating said rotatable shaft about its axis of rotation;
    two permselective membranes affixed directly to said rotatable shaft and spaced from each other by a permeate spacer to provide a first membrane channel therebetween, said first membrane channel being in fluid communication with said second compartment of said rotatable shaft; said permselective membranes being spirally wrapped around said rotatable shaft;
    a feed spacer disposed about the exterior surfaces of said permselective membranes such that a second membrane channel is formed when said permselective membranes are spirally wrapped around said rotatable shaft in overlapping relationship one upon the other to form a compact membrane roll; and
    a means for removal of a retentate stream from said second membrane channel to the exterior of said membrane module; said permselective membranes having properties sufficient to enable its flux to be increased by the combination of shear forces, centrifugal forces and Taylor vortices.

12. The spiral wound membrane module according to claim 11 further comprising a means for restraining the unspiralling of the membrane roll.

13. The spiral wound membrane module according to claim 12 wherein said means for restraining the unspiralling of the membrane roll is an adhesive seam disposed along each edge of the permselective membranes.

14. The spiral wound membrane module according to claim 11 wherein said permeate spacer defining the first membrane channel is an open grid sheet material through which the resultant permeate stream may flow.

15. The spiral wound membrane module according to claim 14 wherein said permeate spacer is formed from a plastic material selected from the group consisting of polyethylene, polypropylene and vinyl.

16. The spiral wound membrane module according to claim 11 wherein said permeate spacer is a woven fabric.

17. The spiral wound membrane module according to claim 11 wherein said feed spacer defining the second membrane channel is an open grid sheet material through which the feedstream and retentate stream may flow.

18. The spiral wound membrane module according to claim 17 wherein said feed spacer is formed from a plastic material selected from the group consisting of polyethylene, polypropylene and vinyl.

19. The spiral wound membrane module according to claim 11 wherein said permselective membranes are selected from the group consisting of: polysulfone membranes, cellulose acetate membranes and any other semipermeable membrane capable of separating the desired permeate stream from the feedstream.

20. The spiral wound membrane module according to claim 11 wherein the permselective membranes are affixed to said shaft by means of a clamp, adhesive or heat sealing.

21. A spiral wound membrane module for use in separating at least one component from a feedstream, said module comprising:
    a generally-hollow rotatable shaft having a sealing means disposed intermediate its length dividing said shaft into a first compartment and a second compartment with means for introducing a feedstream to the first compartment of said rotatable shaft and means for removing a permeate stream from the second compartment of said rotatable shaft through said first compartment;
    a means capable of rotating said rotatable shaft about its axis of rotation;
    two permselective membranes affixed directly to said rotatable shaft and spaced from each other by a permeate spacer to provide a first membrane channel therebetween, said first membrane channel being in fluid communication with said second compartment of said rotatable shaft; said permselective membranes being spirally wrapped around said rotatable shaft;
    a feed spacer disposed about the exterior surfaces of said permselective membranes such that a second membrane channel is formed when said permselective membranes are spirally wrapped around said rotatable shaft in overlapping relationship one upon the other to form a compact membrane roll; and a means for removal of a retentate stream from said second membrane channel to the exterior of said membrane module; of said permselective membranes having properties sufficient to enable its flux to be increased by the combination of shear forces, centrifugal forces and Taylor vortices.

22. The spiral wound membrane module according to claim 21 further comprising a means for restraining the unspiralling of the membrane roll.

23. The spiral wound membrane module according to claim 22 wherein said means for restraining the unspiralling of the membrane roll is an adhesive seam disposed along each edge of the permselective membranes.

24. The spiral wound membrane module according to claim 21 wherein said permeate spacer defining the first membrane channel is an open grid sheet material through which the resultant permeate stream may flow.

25. The spiral wound membrane module according to claim 24 wherein said permeate spacer is formed from a plastic material selected from the group consisting of polyethylene, polypropylene and vinyl.

26. The spiral wound membrane module according to claim 21 wherein said permeate spacer is a woven fabric.

27. The spiral wound membrane module according to claim 21 wherein said feed spacer defining the second membrane channel is an open grid sheet material through which the feedstream and retentate stream may flow.

28. The spiral wound membrane module according to claim 27 wherein said feed spacer is formed from a plastic material selected from the group consisting of polyethylene, polypropylene and vinyl.

29. The spiral wound membrane module according to claim 21 wherein said permselective membranes are selected from the group consisting of: polysulfone membranes, cellulose acetate membranes and any other semipermeable membrane capable of separating the desired permeate stream from the feedstream.

30. The spiral wound membrane module according to claim 21 wherein the permselective membranes are affixed to said shaft by means of a clamp, adhesive or heat sealing.

31. The spiral wound membrane module according to claim 21 wherein said means for removing said permeate stream from said second compartment of said shaft through said first compartment is a concentric permeate tube disposed within said first compartment.

32. The spiral wound membrane module according to claim 31 wherein said sealing means is an o-ring disposed about said concentric permeate tube.

33. A spiral wound membrane module for use in separating at least one component from a feedstream, said module comprising:
a generally-hollow rotatable shaft having a partition vertically disposed along its entire length dividing said rotatable shaft into a first compartment and a second compartment with means for introducing a feedstream to the first compartment of said rotatable shaft and means for removing a permeate stream from the second compartment of said rotatable shaft;
a means capable of rotating said rotatable shaft about its axis of rotation;
two permselective membranes affixed directly to said rotatable shaft and spaced from each other by a permeate spacer to provide a first membrane channel therebetween, said first membrane channel being in fluid communication with said second compartment of said rotatable shaft; said permselective membranes being spirally wrapped around said rotatable shaft;
a feed spacer disposed about the exterior surfaces of said permselective membranes such that a second membrane channel is formed when said permselective membranes are spirally wrapped around said rotatable shaft in overlapping relationship one upon the other to form a compact membrane roll; and
a means for removal of a retentate stream from said second membrane channel to the exterior of said membrane module; said permselective membranes having properties sufficient to enable its flux to be increased by the combination of shear forces, centrifugal forces and Taylor vortices.

34. The spiral wound membrane module according to claim 33 further comprising a means for restraining the unspiralling of the membrane roll.

35. The spiral wound membrane module according to claim 34 wherein said means for restraining the unspiralling of the membrane roll is an adhesive seam disposed along each edge of the permselective membranes.

36. The spiral wound membrane module according to claim 33 wherein said permeate spacer defining the first membrane channel is an open grid sheet material through which the resultant permeate stream may flow.

37. The spiral wound membrane module according to claim 36 wherein said permeate spacer is formed from a plastic material selected from the group consisting of polyethylene, polypropylene and vinyl.

38. The spiral wound membrane module according to claim 33 wherein said permeate spacer is a woven fabric.

39. The spiral wound membrane module according to claim 33 wherein said feed spacer defining the second membrane channel is an open grid sheet material through which the feedstream and retentate stream may flow.

40. The spiral wound membrane module according to claim 39 wherein said feed spacer is formed from a plastic material selected from the group consisting of polyethylene, polypropylene and vinyl.

41. The spiral wound membrane module according to claim 33 wherein said permselective membranes are selected from the group consisting of: polysulfone membranes, cellulose acetate membranes and any other semipermeable membrane capable of separating the desired permeate stream from the feedstream.

42. The spiral wound membrane module according to claim 33 wherein the permselective membranes are affixed to said shaft by means of a clamp, adhesive or heat sealing.

43. A method for separating at least part of one component from a multi-component feedstream which comprises:
feeding said feedstream to a spiral wound membrane module comprising: a generally-hollow rotatable shaft having a means for supplying a feedstream; a means capable of rotating said rotatable shaft about its axis of rotation; two permselective membranes affixed directly to said rotatable shaft and spaced from each other by a permeate spacer to provide a first membrane channel therebetween, said permselective membranes are spirally wrapped around said rotatable shaft; a feed spacer disposed about the exterior surfaces of said permselective membranes such that a second membrane channel is formed when said permselective membranes are spirally wrapped around said rotatable shaft in overlapping relationship one upon the other to form a compact membrane roll; a means for removal of a permeate stream from said first membrane channel to the exterior of said membrane module; and a means for removal of a retentate stream from said second membrane channel to the exterior of said membrane module;

rotating said rotatable shaft and the affixed permselective membranes such that centrifugal forces, shear forces and Taylor vortices are applied to said feedstream, sufficient for increasing the flux of said permselective membranes;

diffusing a permeate stream through said permselective membranes and into said first membrane channel;

removing said permeate stream from said first membrane channel; and removing the retentate of said feedstream from said second membrane channel.

44. A method for separating at least part of one component from a multi-component feedstream which comprises:

feeding said feedstream to a spiral wound membrane module comprising: a generally-hollow rotatable shaft having a wall intermediate its length dividing said rotatable shaft into a first compartment and a second compartment with means for introducing a feedstream to the first compartment of said rotatable shaft and means for removing a permeate stream from the second compartment of said rotatable shaft; a means capable of rotating said rotatable shaft about its axis of rotation; two permselective membranes affixed directly to said rotatable shaft and spaced from each other by a permeate spacer to provide a first membrane channel therebetween, said first membrane channel being in fluid communication with said second compartment of said rotatable shaft; said permselective membranes being spirally wrapped around said rotatable shaft; a feed spacer disposed about the exterior surfaces of said permselective membranes such that a second membrane channel is formed when said permselective membranes are spirally wrapped around said rotatable shaft in overlapping relationship one upon the other to form a compact membrane roll; and a means for removal of a retentate stream from said second membrane channel to the exterior of said membrane module;

rotating said rotatable shaft and the affixed permselective membranes such that centrifugal forces, shear forces and Taylor vortices are applied to said feedstream, sufficient for increasing the flux of said permselective membranes;

diffusing a permeate stream through said permselective membranes and into said first membrane channel;

removing said permeate stream from said first membrane channel and into said second compartment within said rotatable shaft; and removing the retentate of said feedstream from said second membrane channel.

45. A method for separating at least part of one component from a multi-component feedstream which comprises:

feeding said feedstream to a spiral wound membrane module comprising: a generally-hollow rotatable shaft having a sealing means intermediate its length dividing said rotatable shaft into a first compartment and a second compartment with means for introducing a feedstream to the first compartment of said rotatable shaft and means for removing a permeate stream from the second compartment of said rotatable shaft through said first compartment; a means capable of rotating said rotatable shaft about its axis of rotation; two permselective membranes affixed directly to said rotatable shaft and spaced from each other by a permeate spacer to provide a first membrane channel therebetween, said first membrane channel being in fluid communication with said second compartment of said rotatable shaft; said permselective membranes being spirally wrapped around said rotatable shaft; a feed spacer disposed about the exterior surfaces of said permselective membranes such that a second membrane channel is formed when said permselective membranes are spirally wrapped around said rotatable shaft in overlapping relationship one upon the other to form a compact membrane roll; and a means for removal of a retentate stream from said second membrane channel to the exterior of said membrane module;

rotating said rotatable shaft and the affixed permselective membranes such that centrifugal forces, shear forces and Taylor vortices are applied to said feedstream, sufficient for increasing the flux of said permselective membranes;

diffusing a permeate stream through said permselective membranes and into said first membrane channel;

removing said permeate stream from said first membrane channel and into said second compartment within said rotatable shaft; and removing the retentate of said feedstream from said second membrane channel.

46. A method for separating at least part of one component from a multi-component feedstream which comprises:

feeding said feedstream to a spiral wound membrane module comprising: a generally-hollow rotatable shaft having a partition vertically disposed along its entire length dividing said rotatable shaft into a first compartment and a second compartment with means for introducing a feedstream to the first compartment of said rotatable shaft and means for removing a permeate stream from the second compartment of said rotatable shaft; a means capable of rotating said rotatable shaft about its axis of rotation; two permselective membranes affixed directly to said rotatable shaft and spaced from each other by a permeate spacer to provide a first membrane channel therebetween, said first membrane channel being in fluid communication with said second compartment of said rotatable shaft; said permselective membranes being spirally wrapped around said rotatable shaft; a feed spacer disposed about the exterior surfaces of said permselective membranes such that a second membrane channel is formed when said permselective membranes are spirally wrapped around said rotatable shaft in overlapping relationship one upon the other to form a compact membrane roll; and a means for removal of a retentate stream from said second membrane channel to the exterior of said membrane module;

rotating said rotatable shaft and the affixed permselective membranes such that centrifugal forces, shear forces and Taylor vortices are applied to said feedstream, sufficient for increasing the flux of said permselective membranes;

diffusing a permeate stream through said permselective membranes and into said first membrane channel;

removing said permeate stream from said first membrane channel and into said second compartment within said rotatable shaft; and removing the retentate of said feedstream from said second membrane channel.

* * * * *